Oct. 11, 1938.  J. G. GHOLSTON  2,133,023
CURRENT MOTOR
Filed Aug. 16, 1935  4 Sheets-Sheet 1

Jabez G. Gholston INVENTOR
BY Victor J. Evans & Co.
ATTORNEY

Oct. 11, 1938.   J. G. GHOLSTON   2,133,023
CURRENT MOTOR
Filed Aug. 16, 1935   4 Sheets-Sheet 4

Jabez G. Gholston INVENTOR
BY Victor J. Evans & Co.
ATTORNEY

Patented Oct. 11, 1938

2,133,023

UNITED STATES PATENT OFFICE 2,133,023

CURRENT MOTOR

Jabez G. Gholston, Washington, D. C.

Application August 16, 1935, Serial No. 36,586

1 Claim. (Cl. 170—88)

This invention relates to current motors of the hydraulic bucket chain type and has for an object to provide a practical and economical device for developing power from slow or fast flowing water, including streams, rivers, tidal and ocean currents.

A further object is to provide a device of this character in which the hydraulic buckets have buoyancy sufficient to partially or wholly support the entire device.

A further object is to provide, when the depth of water, character of bottom, direction of flow and other conditions are favorable for their use, novel spuds for anchoring the device in such manner as to permit unrestrained movement of the device in a vertical direction.

A further object is to provide a device of this character having water ballast tanks located so that the device may be kept level under varying conditions.

A further object is to provide a device of this character having pontoons for lifting the entire device out of the water.

With the above and other objects in view the invention consists of certain novel details of construction and combinations of parts hereinafter fully described and claimed, it being understood that various modifications may be resorted to within the scope of the appended claim without departing from the spirit or sacrificing any of the advantages of the invention.

In the accompanying drawings forming part of this specification,

Figure 1:
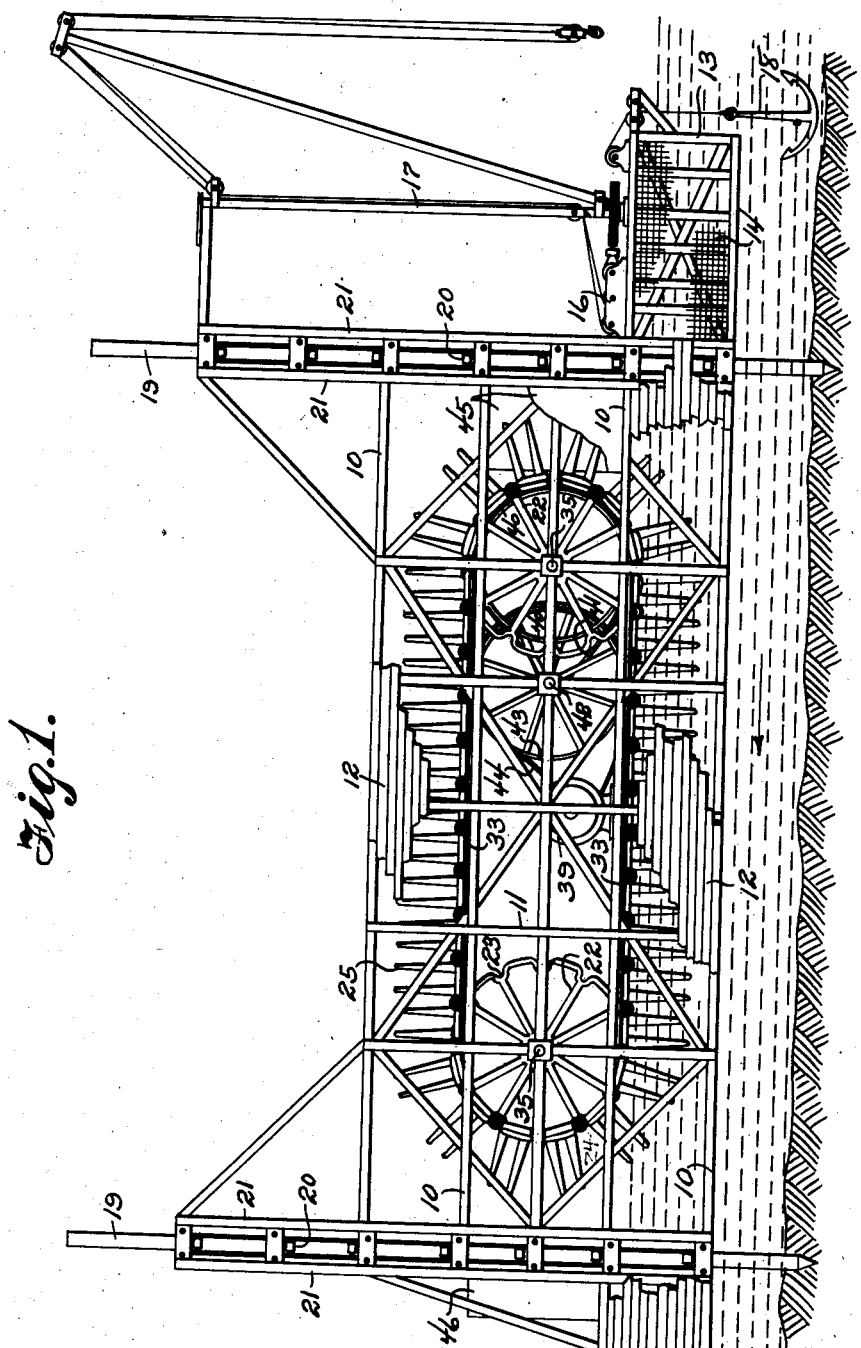
Figure 1 is a side elevation of a current motor constructed in accordance with the invention.

Referring now to the drawings in which like characters of reference designate similar parts in the various views, the device is shown to comprise a frame including horizontal bars 10 connected at intervals by vertical bars 11 over which sheathing 12 may be placed to provide vertical side walls, the lower portions of which are submerged in practice to prevent logs, ice and other floating objects from becoming fouled in the endless chain of hydraulic buckets and to serve as guides or vanes for controlling the device so that the direction of flow will be parallel with the longitudinal center line of the device and squarely against the hydraulic buckets. The end of the frame facing the current is provided with a drift protection device including a frame 13 which is pointed at the front and is provided with bars or grating 14 to catch and deflect floating objects. A floor 15 is laid on the drift protection device to support a winch 16, a derrick 17 and an anchor 18 for emergency and safety.

For securely anchoring the device spuds 19 are provided at the front and rear corners, each spud preferably being formed of a metal tube and being mounted between rollers 20 arranged in sets of four rollers, two rollers of each set having their axles disposed parallel with the longitudinal center line of the device and the other two having their axles disposed parallel with the transverse center line of the device. The rollers are carried by frames 21 which extend substantially vertically from the device at the front and rear corners thereof. The spuds are sufficiently heavy to seat firmly in the bottom of the stream or other body of water where the device is to be used, and the spuds permit unrestrained movement of the device upwardly and downwardly since the rollers turn freely and form non-grip spud guides.

The endless hydraulic bucket chain comprises sprocket wheels 22 which are provided with concave seats 23 in the rims to receive the transverse axles 24 of the bucket chain. Each bucket 25 is preferably formed hollow so as to be buoyant, and may be formed of metal, wood, or a combination of both. When the bucket is large, or other conditions require, transverse walls 26 are arranged within the interior of the bucket to provide water tight compartments and strengthen the bucket and the opposite sides 27 of the buckets slope symmetrically from the base 28 to the tip 29.

When operating conditions are such as to render buoyant hydraulic buckets uneconomical or impractical, the hydraulic buckets will be constructed in wall-like fashion, straight and solid and composed of wood or metal or a combination of both.

Figure 5:
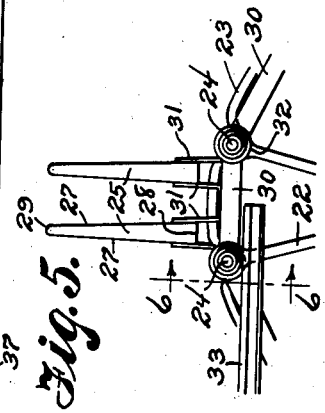
Figure 5 is a detail side elevation showing a pair of hydraulic buckets and the mountings thereof.
Figure 6:
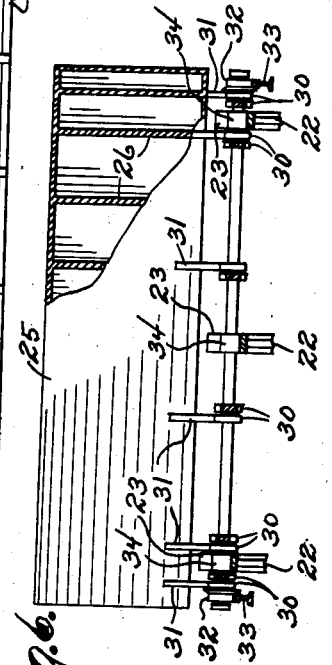
Figure 6 is a cross sectional view taken on the line 6—6 of Figure 5 and showing one of the buckets in elevation and partly broken away.

Each bucket is mounted on certain of the chain links 30 by means of arms 31, as best shown in Figures 5 and 6. The links are connected together by the free turning axles 24 to form an endless chain and the axles are equipped with revolvable wheels 32 which ride on track rails 33 carried by the frame of the device as shown in Figure 1, when the upper reach of the endless chain moves between the sprocket wheels. The axles are provided with free turning sleeves 34 which have rotating contact with the concave seats 23 when entering or leaving the sprocket wheels to reduce wear and reinforce the axles against bending strains.

The sprocket wheels 22 are fixed to shafts 35 to assure simultaneous turning in the same direction of all parts and avoid gripping which might occur if the sprocket wheels turned free on their shafts.

Figure 2:
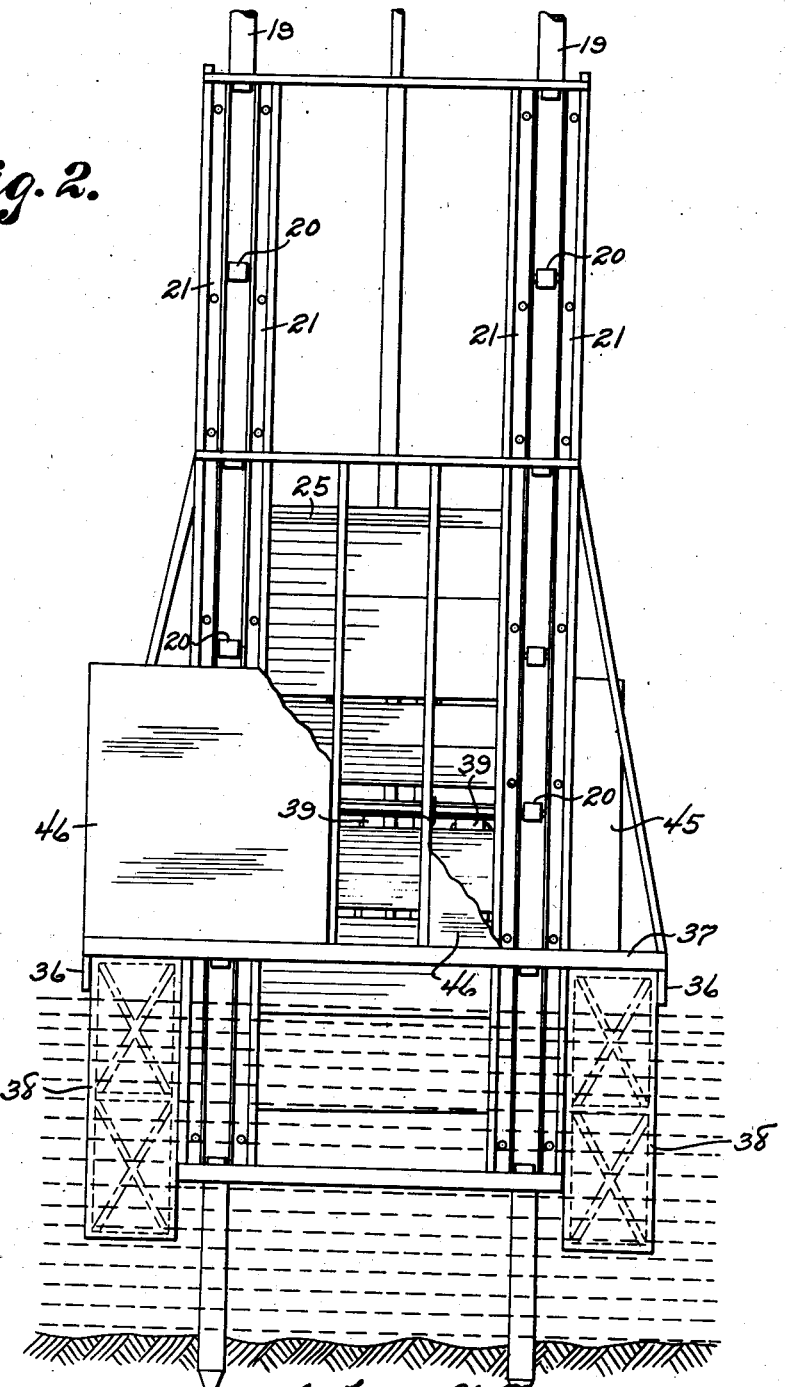
Figure 2 is an end elevation of the current motor.

The frame of the craft is provided at the sides with overhangs or brackets comprising longitudinal bars 36 and transverse bars 37 as best shown in Figure 2 for the purpose of engaging pontoons 38. These pontoons are to be used when the buckets have insufficient buoyancy to float the craft, and are used as auxiliary equipment for raising the craft out of the water for towing, repairing, or other purposes. The pontoons are of conventional type. The pontoons push up against the transverse bars 37 as the water is expelled from them in the usual manner.

The velocity of flowing water will generally vary from one to six miles per hour so that it is necessary to provide a system of power transmission from the sprocket wheels of the sprocket wheel shaft 35 to the electric generators 39, or other apparatus, that will be greater than the speed of the flowing water so as to obtain the required revolutions per minute of the devices to which the power is delivered. For this purpose the present embodiment of the invention illustrates a large pulley 40, best shown in Figure 1, which is either fixed to one of the sprocket wheels 22 or to the shaft 35 of one of the sprocket wheels and is connected by a belt 41 to a small belt pulley fixed to a shaft 42 which is carried by the frame of the device. A plurality of large belt pulleys 43 is secured to the driven shaft 42 and these belt pulleys are connected by belts 44 to the corresponding electric generators 39, or other apparatus, three of these being illustrated in the present embodiment.

Figure 3:
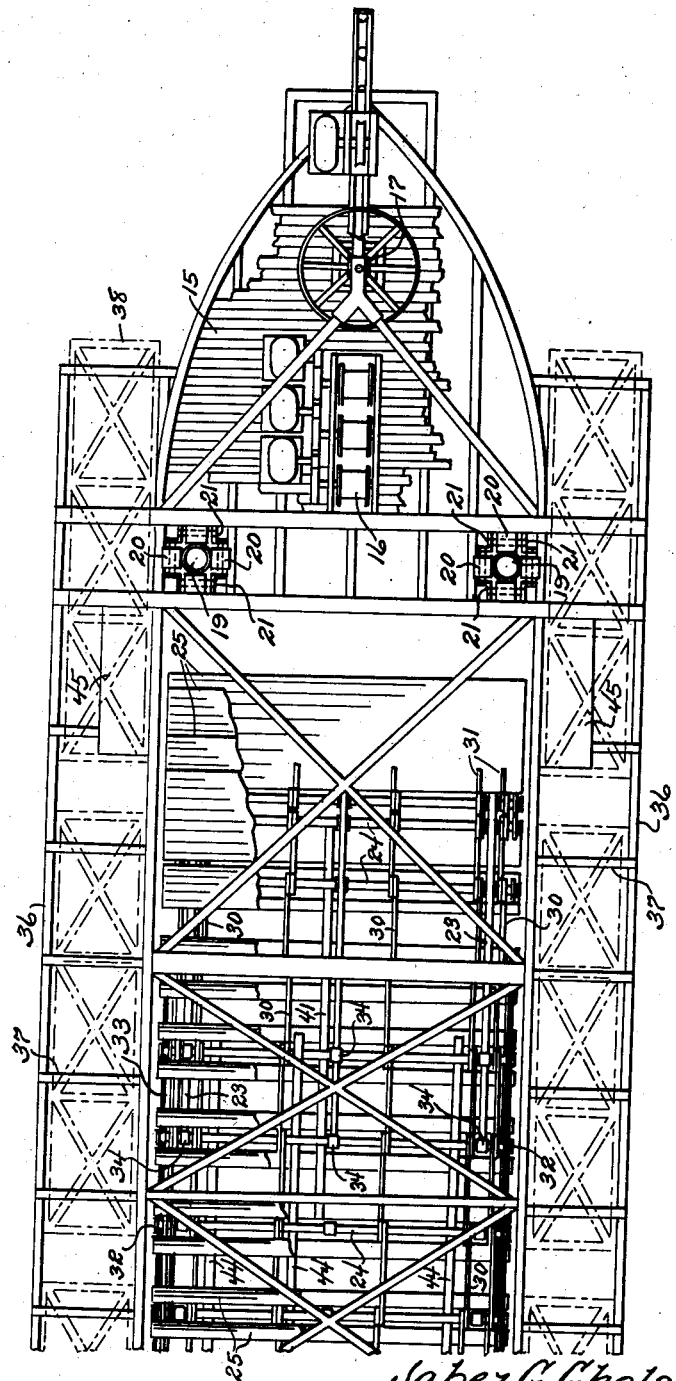
Figure 3 is a plan view showing the current motor from the bow to about midship.
Figure 4:
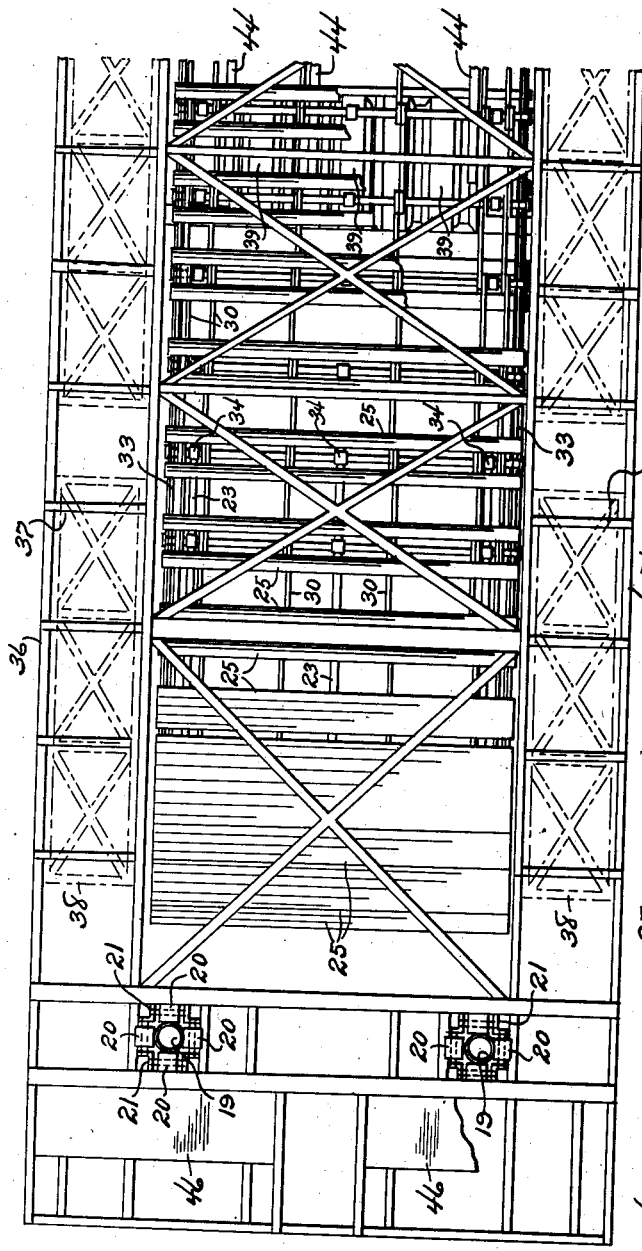
Figure 4 is a plan view showing the current motor from the stern to a point about midship.

Water ballast tanks 45 and 46, best shown in Figures 3 and 2, respectively, are mounted on the frame near the four corners thereof for the purpose of properly adjusting the frame with relation to the surface of the water. Should the frame have a tendency to tilt due to unbalanced weight or other cause, the water ballast in the tanks may be adjusted to bring the longitudinal and transverse axis of the frame parallel to the surface of the water so that all of the hydraulic buckets will be immersed to identical depth below the surface of the water.

The device may be assembled on the site where it is to operate, or assembled elsewhere and towed to the location it will occupy, on the pontoons 38, or on the hydraulic buckets when they have sufficient buoyancy to support the entire device. The amount of power developed will depend upon the velocity of the current and the area of hydraulic buckets opposed to the flow. The hydraulic buckets can be made to penetrate the water slightly or to their full depth by admitting or expelling water to or from the pontoons or ballast tanks, or both.

It will be pointed out that preferably the spuds 19 are formed of hollow tubing of light weight so as to be easily transported and erected, and in use it is intended that after the spuds are set in position water will be injected into the spuds to any desired level so that weight and stability will be added to the spuds to prevent any danger of accidental dislodgement.

From the above description it is thought that the construction and operation of the invention will be fully understood without further explanation.

What is claimed is:

In a current motor, a frame, spaced parallel rails forming a track open at both ends on the frame, a free moving endless hydraulic bucket chain having wheels riding upon the track, said chain being adapted to be reversed in direction of travel on the track when current flow is reversed, buckets on the chain, an axle rigidly secured to the base of each bucket, said track supporting the upper reach of the chain in a horizontal position, the track terminating short of each end of said reach, and sprocket wheels engaging the axle and moved by the chain, the upper portions of the sprocket wheels being substantially level with the ends of the track so that the chain may move in either direction on the track without obstruction.

JABEZ G. GHOLSTON.